United States Patent

[11] 3,619,769

[72] Inventors Felix N. Kusenberger;
John R. Barton; Robert R. King, all of San Antonio, Tex.
[21] Appl. No. 831,935
[22] Filed June 10, 1969
[45] Patented Nov. 9, 1971
[73] Assignee Amtel, Inc.
Providence, R.I.

[54] HALL EFFECT WELD CONDITION INSPECTION EQUIPMENT WITH MEANS TO LATERALLY POSITION THE EQUIPMENT RELATIVE TO THE WELD
17 Claims, 15 Drawing Figs.

[52] U.S. Cl. ................................................. 324/37
[51] Int. Cl. .............................................. G01r 33/12
[50] Field of Search ......................................... 324/37, 40, 45

[56] References Cited
UNITED STATES PATENTS
| | | | |
|---|---|---|---|
| 2,083,896 | 6/1937 | Drake et al. | 324/37 |
| 2,719,953 | 10/1955 | Waldie | 324/37 |
| 3,019,385 | 1/1962 | Kalbfell | 324/34 |
| 3,278,838 | 10/1966 | Behr et al. | 324/34 |

FOREIGN PATENTS
1,506,642 12/1967 France .................... 324/37

Primary Examiner—Rudolph V. Rolinec
Assistant Examiner—R. J. Corcoran
Attorney—Whittemore, Hulbert & Belknap ABSTRACT: A longitudinally welded ferrous bimetal strip passes continuously at production speed from a welding machine successively through safety head and inspection head units, in the latter of which the strip is magnetized and electromagnetically monitored by an inspection probe for the purpose of detecting magnetic perturbations occasioned by leakage of flux, such as might be caused by various conditions of the weld zone as monitored by the probe. The latter operates under the principle of the Hall effect. The signal from the inspection probe is built-up and fed through signal processing circuitry, then imposed on indicating meter equipment of a readout monitor unit located adjacent the welding machine, where an attendant may make any needed adjustment as indicated at the monitor unit. The safety head unit protects the inspection probe head unit by removing surface accumulation on the strip apt to damage the probe of the inspection head, and by detecting major flaws in the weld, lifting the probe to a safe position to avoid such damage by a flaw. The safety and inspection head units are mechanically similar in many respects and have provisions for a proper lateral positional relationship between the longitudinal weld zone and detecting components of the safety and inspection units.

INVENTORS
FELIX N. KUSENBERGER
JOHN R. BARTON
ROBERT R. KING

BY

ATTORNEYS

INVENTORS
FELIX N. KUSENBERGER
JOHN R. BARTON
ROBERT R. KING

BY
ATTORNEYS

INVENTORS
FELIX N. KUSENBERGER
JOHN R. BARTON
ROBERT R. KING

BY

ATTORNEYS

INVENTORS
FELIX N. KUSENBERGER
JOHN R. BARTON
ROBERT R. KING

BY *Whittemore, Hulbert &*
*Belknap*

ATTORNEYS

FIG.13 CIRCUITS POWER SUPPLY 3,619,769

HALL EFFECT WELD CONDITION INSPECTION EQUIPMENT WITH MEANS TO LATERALLY POSITION THE EQUIPMENT RELATIVE TO THE WELD

BACKGROUND OF THE INVENTION

Field

The equipment herein shown and claimed finds application in the field of nondestructive weld inspection, particularly as carried out in a continuous way, for example, in monitoring bimetallic strip welds, butt or overlapped, extending longitudinally of an advancing strip. The object is to detect and signal the presence of a defective welded seam, or confirm the production of an acceptable weld, without interrupting the footage rate of weld production concurrently with the detection and signalling. In employing magnetic perturbation-type probe equipment, operating on the Hall effect principle, the present method and equipment contrast sharply with visual and mechanical hand test or metallurgical means and methods presently utilized to monitor weld quality; and in respect to accuracy and reliability, lowering of requisite operator skill level, consumption of time, etc., the present improvement presents significant advantages.

We are unaware of prior art dealing with the particular type of continuous nondestructive, magnetic perturbation-type weld inspection means and method which are presented herein.

CROSS-REFERENCE TO RELATED APPLICATIONS

The copending application of Kusenberger, Barton and King, Ser. No. 831,976, filed June 10, 1969, discloses specific electrical components and circuitry of the inspection head unit of the present equipment; and the copending application of Birdwell et al. and Kusenberger, Ser. No. 832,641, filed June 12, 1969, discloses components and circuitry of the readout monitoring unit, as also embodied in the present equipment. The copending application of Briggs, Ser. No. 634,924, filed May 1, 1967, U.S. Pat. No. 3,517,158 discloses welding equipment such as is also shown herein.

SUMMARY OF THE INVENTION

During the fabrication of a welded bimetallic strip, which typically consists of continuously, lap or butt welding stainless steel and galvanized strip elements, variations in strip material as well as welding conditions (electrodes, forging pressure, zinc accumulation on welding tires, etc.) can result in unacceptable weld quality. Although visual and manual mechanical tests, and metallurgical methods, are presently utilized to monitor weld quality, these methods require considerable operator skill, and they severely limit production line speed capabilities. Furthermore, these methods can be used to sample only a small part of the total material being produced. Because of these limitations, the present equipment has become evolved, applying a magnetic perturbation technique to continuously monitor weld quality in the strip as it is produced on the line. Operational results have established that this equipment can continuously provide the welding operator with information of the most useful kind concerning the quality of the weld.

The two ferrous metal strips to be welded together are tension-drawn from payoff reels and through successive individual accumulator towers into a weld generator and fixture unit, in which a welded seam union of the type referred to above is effected. A readout or monitor unit for the Hall probe type weld inspection subassembly or unit, which subassembly detects weld quality on the basis of magnetic flux perturbation at the weld zone, is disposed adjacent the welding machine, so that an attendant at this point may visually and/or audibly monitor the weld quality. The Hall inspection probe head, with structural features of which the present invention deals, signals back to the monitor unit as to the quality, the head being located well in advance of the welder in the direction of strip travel, so that an attendant at the welder and monitor unit can make any corrective adjustment of the former indicated to be in order.

The invention also deals with structural features of a safety detection head interposed between the welding machine and the inspection probe structure. This safety head signals for an elevating of the sensitive inspection probe away from the strip in the event of foreign material on the strip, or if the latter contains a weld separation or serious flaw, thus to protect the probe. A number of structural features of the Hall probe head and safety head are very similar or closely related, including mounting structure, roller means to support the advancing welded strip, means to insure proper register of the weld zone with sensing elements and magnetizing pole pieces, etc., of the heads.

The Hall probe and safety head subassemblies, as well as the readout monitoring unit or subassembly, are electrically connected as a system through electrical and electronic circuitry such as constitutes the claimed subjects matter of the above-identified applications of Kusenberger et al. and Birdwell et al.

Pursuant to the present invention, as the bimetallic welded strip passes from the welder over the safety head unit, a movable carriage of the latter is continuously referenced to one edge of the strip, which carriage supports an air manifold and mechanical sensors. The air manifold blows loose foreign material from the strip; and the mechanical sensors, which are downstream from the air manifold, detect the presence of any remaining foreign material, also a strip separation, and/or failure of the transverse butt-weld joint. When such conditions are detected, the sensors, acting through a control circuit as detailed in the Kusenberger application, will cause the Hall probe of the inspection head to be lifted free of the strip surface.

Leaving the safety head, the strip traverses a distance and then enters the inspection head, the spacing between the safety and inspection heads being designed to give sufficient reaction time for the safety probe lifting mechanism. The inspection head utilizes the magnetic perturbation technique to monitor the condition of the strip weld. Fundamentally, this technique consists of magnetizing the strip as it passes through the head and of detecting perturbations in a magnetic leakage flux at the surface of the strip which are caused by various conditions present within the weld.

In terms of structure, the strip passes over a pair of vertical guide rollers on the inspection head unit which maintain the strip-to-magnetizing pole piece spacing. The magnetization circuit and probe are attached to a carriage which is referenced to the edge of the stainless steel strip, in a manner generally similar to its referencing in the safety head unit, and the probe continuously monitors the condition of the weld as it passes over the magnetizing field. Signals from the probe are fed to a preamplifier circuit which is mounted on the inspection head unit; and the output of the preamplifier is fed to other signal processing circuits housed in a signal circuit enclosure. The processed information is read out on two relay meters of the monitor unit, the wiring of which is detailed in the Birdwell application; and when the meter indication is outside of certain limits, visual and audible alarms are actuated, whereupon an attendant at the monitor and welder may make any indicated corrective adjustment of the welder.

DESCRIPTION OF A PREFERRED EMBODIMENT

Figure 2:
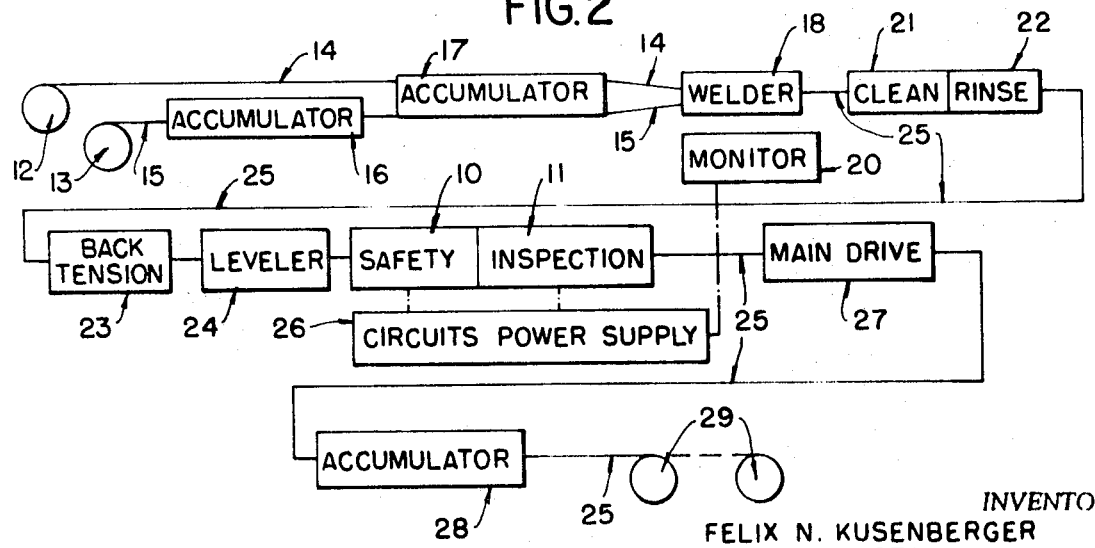
FIG. 2 is a schematic line and block diagram of the comprehensive welder and weld monitoring system of which the components of FIG. 1 are part.
Figure 3:
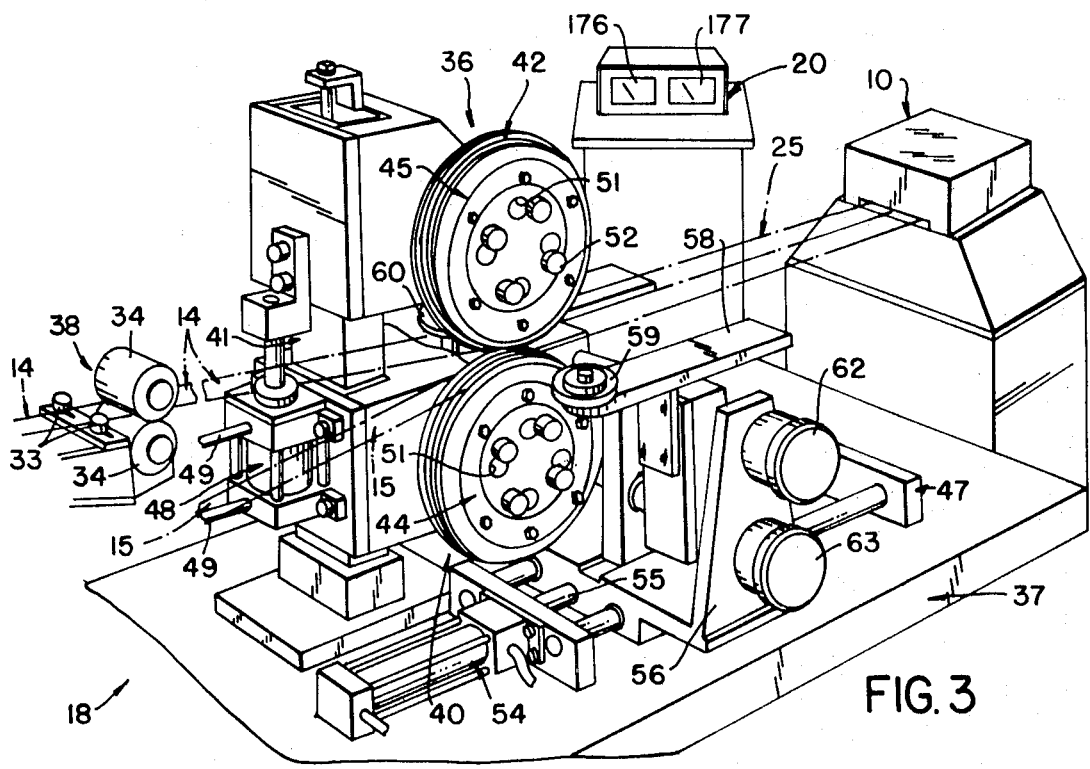
FIG. 3 is a fragmentary view in perspective of actual continuous welding equipment contemplated for use in the combined system diagrammed in FIG. 2, the readout or monitor unit of FIG. 2 also being shown, and cable connections being omitted.

FIG. 2 schematically illustrates components of a comprehensive welding and weld inspection system of which the safety detection and Hall inspection head units of the invention, generally designated 10 and 11, respectively, are part. The system comprises, in succession commencing at the upper left hand, (a) a pair of rotatively mounted payoff reels 12, 13 from which the respective ferromagnetic strips 14 and 15 are drawn by suitable tensioning means (to be referred to); (b) a pair of infeed accumulator towers 16 and 17 through which the strips 15, 14 are respectively trained in vertical passes; (c) a weld generator and fixture mechanism 18, of which the continuous welder of FIG. 3 is a part, and adjacent which welder the monitor subassembly or unit 20 is physically positioned; (d) a subassembly which may incorporate at 21, 22 cleaning and rinsing provisions of a known type; (e) a back tension unit 23 and leveler unit 24 to restrain the welded strip 25 issuing from welder 18 against undulation; (f) the safety unit 10; (g) the inspection probe unit 11, both of the latter two, as well as monitor 20, being electrically connected with circuits power supply means, generally designated 26 in FIG. 2, which is contained in a single signal circuit enclosure; (h) a main drive unit 27 drawing strips 14, 15 and 25; (i) a final accumulating tower 28 through which the welded and inspected strip 25 is trained; and (j) rewind or recoiler units 29 onto which the welded strip 25 is received. Dot-dash lines in FIG. 2 designate electrical cable connections between the power supply system 26 and the safety, inspection and monitor units 10, 11 and 20, respectively, such as are individually shown in FIGS. 12-14.

The strips 14, 15, in passing to welder 18, are accurately guided appropriately at the edges thereof by side guide rollers 33 (FIG. 3), also horizontally journaled rolls 34, in order to assure a proper, extremely slightly overlapped side-by-side relationship to one another in entering welding fixture 18. This is as contemplated in the above-identified Briggs application, as well as its predecessor U.S Pat., No. 3,325,623 of June 13, 1967. The component strips 14, 15, as well as the ultimate welded strip 25, are appropriately trained about suitable idler rollers in entering and leaving the accumulator towers 16, 17 and 28, the welding structure 18, the safety detection and inspection subassemblies 10, 11 and the recoiler units 29.

As generally illustrated in FIG. 3, a continuous, roller-type resistance welding machine, generally designated 36, is the main operational component of the generator and welding assembly 18 of FIG. 2; however, it is to be understood that welding by induction, direct external heat and the like are also contemplated. Machine 36 is further illustrated and described in greater detail in the copending application of Briggs identified above.

It is shown as being fixedly mounted upon a massive horizontal base 37, past which the pair of strips 14, 15 are fed in vertically convergent relation to one another, each under the control of an infeed guide and restraining device 38 which includes the rollers 33 and 34.

Generally considered, the welding fixture 36 comprises an improved rolling wheel structure which is characterized by a fixed lower roller unit 40 rigidly supported on base 37 by a massive footed upright column 41 of rectangular cross section; and a movable upper roller unit 42 adjustably guided vertically on column 41, with the units 40 and 42 rotatably supporting narrow lower and upper seam rolling wheels 44, 45, respectively. Fixture or head 36 also comprises a side guide and restraining unit, generally designated 47, which laterally controls the strips 14, 15 as they pass into and through the rolling zone of the wheels 44, 45; and an improved resistance welding electrode unit (not shown) acts on each strip 14, 15 as it comes into the weld zone, as illustrated and described in the Briggs patent and application identified above.

A pneumatic cylinder 48 controls the elevation and lowering of roller unit 42; and as described in said Briggs application, the opposite ends of cylinder 48 have the usual airhose connections 49 through which the cylinder may be reversely pressurized, under the control of appropriate valving (not shown) to raise and lower the wheel 45. The upper and lower seam rolling wheels are identical and interchangeable, both in respect to improved means for cooling the seam rolling tire part thereof, and for their quick release from shaft means journaling the wheels. These features are shown and described in detail in the identified Briggs application.

The invention shown and claimed in that application affords means for a direct internal cooling of the wheels 44, 45 as well as for a quick change mount of each wheel on its shaft, as by the provision of an annular series of circumferentially spaced, bayonet-type slots 51 receiving axially elongated studs 52. The side guide and restraining structure 47 of the fixture 36 of FIG. 3 is adjustably operated by a reversible air cylinder 54 bolted to a forward side thereof, the plunger 55 of which cylinder has an adjustable threaded connection to the adjacent side of the side guide and restraining device 47.

The device 47 includes upright plates 56 each mounting an elongated bar 58 welded or otherwise rigidly secured to its top, in the manner of the head of a T, and each bar 58 has provision, adjacent the end thereof facing the direction from which the strips 12, 13 advance, for rotatably journaling one of two side guide and restraining rolls 59, 60. There are means at 62, 63 for the lateral adjustment of the side guides, through associated mechanism described in detail in the Briggs application identified above.

Figure 1:
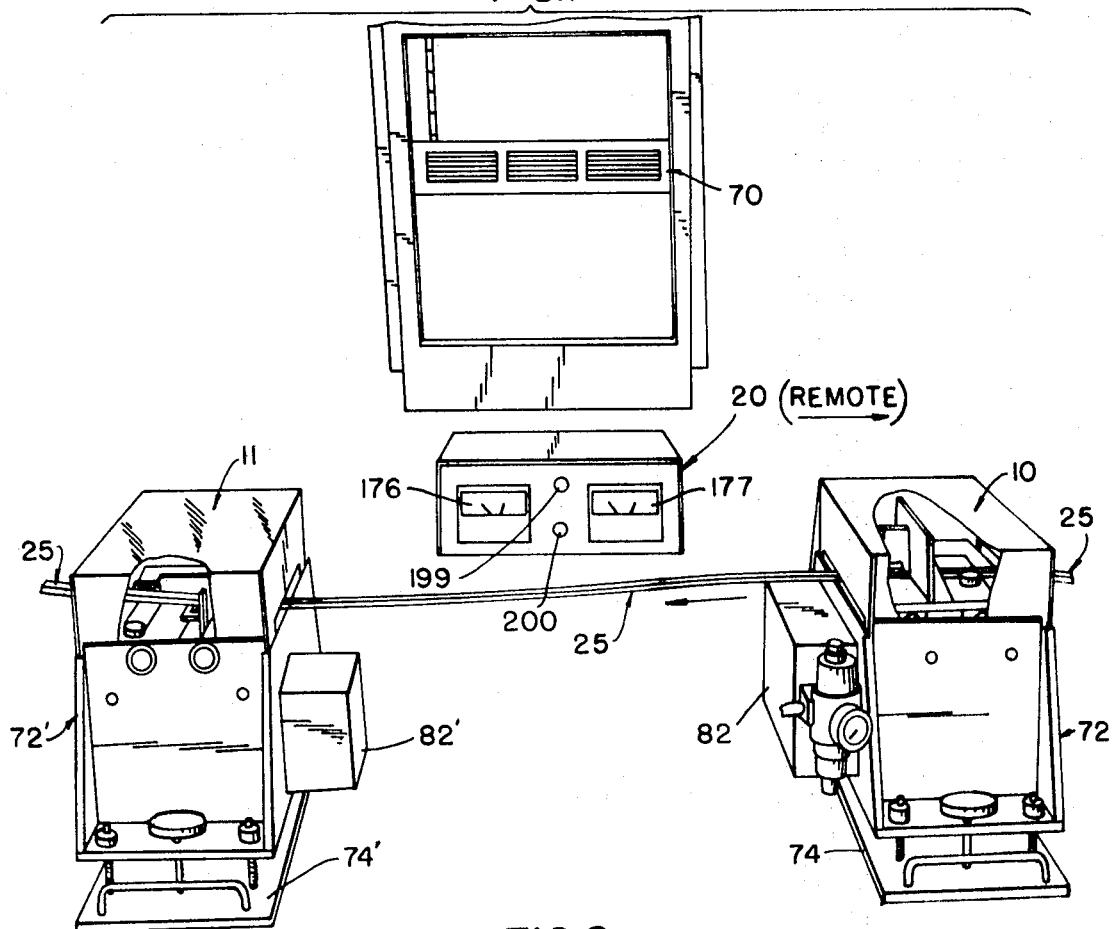
FIG. 1 is a perspective exploded view illustrating component safety head, inspection head, readout head and signal circuit enclosure units of the invention, cable connections being omitted.

The safety and inspection equipment, as it is schematically and perspectively presented in FIG. 1, consists of four main subassemblies, namely the safety detection unit 10, the inspection unit 11, the remote located, readout monitor unit 20 and a signal enclosure unit, specially designated 70, which contains the circuits power supply means 26. A section of welded bimetallic strip 25 passes right to left to be inspected. The functional locations of the four units in a full speed production line are illustrated by the block diagram of FIG. 2. The safety and inspection heads are mounted directly in the line between the leveler 24 and the main drive 27, with the safety head 10 upstream of the inspection head 11, and the signal enclosure 70 containing power supply means 26 is immediately adjacent the safety and inspection heads. As indicated above, the safety head incorporates mechanisms and controls which automatically lift the inspection head probe free of the strip 25 when strip conditions (strip separation or foreign material) exist which could cause damage to the inspection probe. The monitor unit 20, to repeat, is mounted adjacent the welder 36. Monitor unit 20 contains two indicators which provide the welding operator with information concerning the changing or average weld conditions in the strip 25.

The design of both the safety and inspection heads 10, 11 is such that either may be removed from the line without interrupting the production of welded strip, as will appear. These units will be described in the natural sequence in which the welded strip 25 reaches and traverses them.

SAFETY DETECTION UNIT

Figure 4:
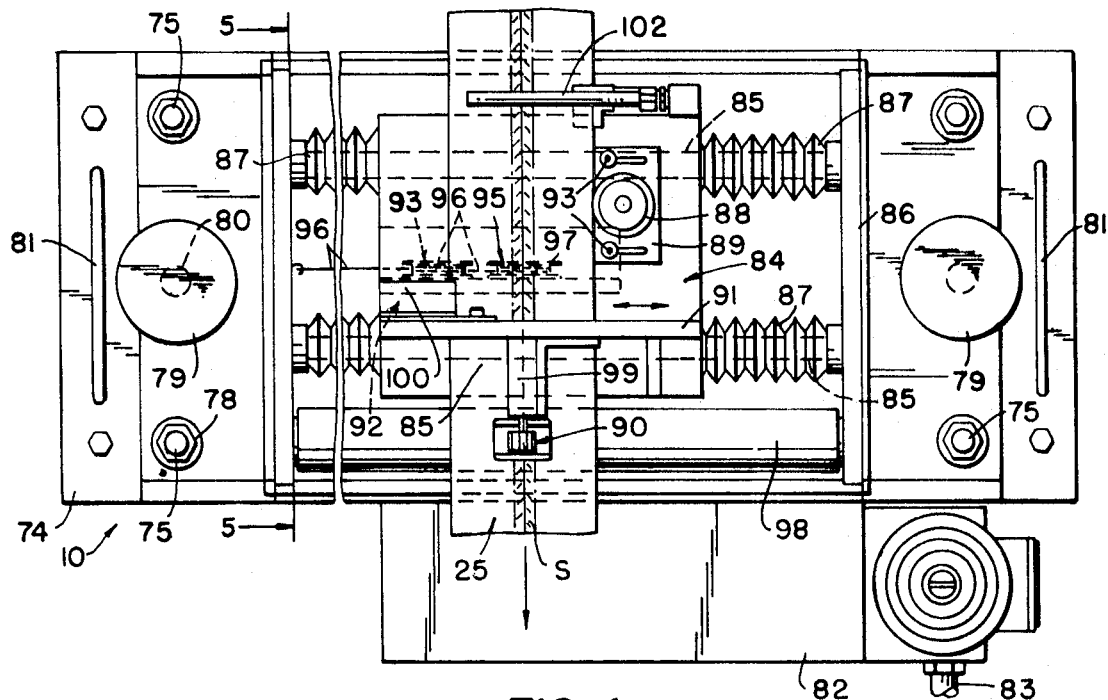
FIG. 4 is a top plan view of the safety detection head structure of the invention.
Figure 5:
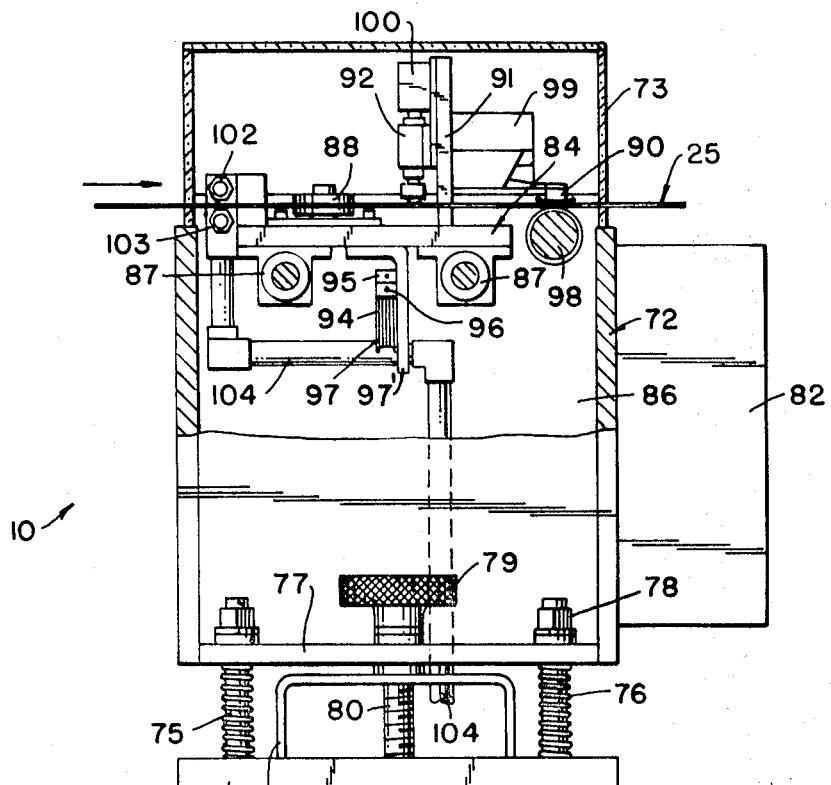
FIG. 5 is a view in end elevation, partially broken and in vertical section on a line corresponding to line 5—5 of FIG. 4.

FIGS. 4 and 5 show structural features of the safety detection head unit 10, which is illustrated in FIG. 1 in its operative relationship to Hall-effect inspection head unit 11, also to the cabinetlike enclosure 70 housing the power supply system 26. The complete wiring circuitry of units 10 and 11, as connected to the power supply, appears in FIGS. 12, 13 and 14, and will be hereinafter described.

Operating components of the detection unit 10 are carried in and on a rectilinear open-topped casing or cabinet 72 removably covered at its top by an appropriate shielding closure 73 which is preferably of a transparent material, such as Lucite, to enable a visual observation of the operating parts of detection unit 10. In common with the Hall probe unit 11, unit 10 has means for accurately mounting the same adjustably upon an appropriate floor-supported base member 74, in such manner that the unit may be removed in its entirety from the inspection line and replaced by another, if desired, with minimal interruption of inspected output.

To this end, base 74 carries at each end thereof a laterally spaced pair of fixed upright studs 75, each encircled by a coil compression spring 76 which bottoms on base member 74. The floor 77 of casing 72 rests on the springs, the studs 75 extending upwardly through openings in floor 77, above which they threadedly receive adjustable nut means 78 by which the individual spring forces may be varied.

In order to hold cabinet 72 downwardly as it variably compresses springs 76, a knurled head nut 79 is rotatably received in a third opening at each end of cabinet 72, this nut being axially restrained in both directions in relation to the cabinet floor member 77 and adjustably threading downwardly onto a third upright stud 80 fixed on base member 74; so that rotation of nut 79 will raise or lower the cabinet to a desired degree. Baillike hand pieces 81 at each end of base member 81 enable unit 10 to be readily lifted and bodily transported.

The transparent top closure 73 has side openings of an appropriate size to accommodate the welded strip 25 as it passes from welding fixture 36 through the safety detection unit 10 on the way to the Hall inspection unit 11; and an appropriate junction box 82 at a side of casing 72 houses terminal connections thereof for the sensing means of unit 10 (to be described). Cable connections, all of which appear in FIG. 12, and typically represented by a cable 83 in FIG. 4, enter box 82 to connect unit 10 electrically with amplifier and other means of the power supply circuit 26.

A rugged platelike rectangular carriage 84 is disposed within cabinet 72 adjacent the top thereof for lateral horizontal shift in the directions of the double-headed arrow in FIG. 4. This carriage is slidably guided on a pair of elongated rods 85, each of which is fixedly supported at its ends in upright parallel walls 86 of the casing or cabinet 72; and compressible corrugated boots 87 surround the rods 85, acting between the walls 86 and opposite sides of carriage 84 to protect the rods from accumulation of foreign matter and thus ensure a free sliding action of carriage 84 on rods 85, under the influence of simple spring means to be described.

A strip edge guide roller 88 is carried on an upright axis by a bracket member 89 adjustable on carriage 84, the roller engaging against one edge of the traveling welded strip 25 and acting, through its fixed connection to the carriage, to maintain a proper register or position relationship of certain sensing heads on carriage 84 to the welded seam S of advancing strip 25, under the influence of the spring means referred to above. The heads in question are a foreign material sensor head 90 mounted by an upright bracket 91 on carriage 84, and a similarly mounted strip separation sensor head 92, both of which heads are electrically connected to terminals within the junction box 82 to perform functions to be described. Such connections involve microswitch means triggered by the respective sensors 90 and 92.

For the purpose of continually urging guide roller 88 against an edge of strip 25 and thus maintaining proper positioning of carriage 84 and its associated guide and sensitive detection means relative to the strip seam S, the invention contemplates the use of a pair of known-type spring motor devices 94, 95, typically such as a Hunter spring Spirator. Each is characterized by a small flexible cable 96 anchored at its end to the left-hand upright cabinet wall 86 (FIG. 4) and coiled under spring tension on a spool 97 which is rotatably mounted on a depending bracket 97' (FIG. 5) on carriage 84.

Thus, with the guide roller 88 properly adjusted on carriage 84, as by the bolt and slot means 93 (FIG. 4), which adjustment is determined by the distance between the strip edge and the welded seam S, the carriage 84 is automatically positioned reactively, by the spring motor means 94, 95, to maintain the foreign material sensor 90 centered on the seam to signal properly as to foreign material, and to maintain the strip separation sensor 92 in proper lateral relation to the unguided edge of strip 25 to enable it to detect and signal in regard to a weld separation or an apparent increase in total strip width.

A horizontally elongated vertical supporting guide roll 98 of substantial diameter, the ends of which journal in walls 86, sustains the strip 25 from beneath in a proper vertical relation to foreign material sensor head 90 to detect the presence of loose weld particles and other undesirable foreign material on the surface of strip 25, in particular at its weld seam S. In such event the sensor 90 forwards an electrical signal to a microswitch 99 directly supported (as is sensor 90) on bracket 91; and such signal is amplified by circuitry to be described and forwarded to Hall inspection unit 11, being effective thereupon to lift the inspection probe of that unit at a proper time so as to protect against possible damage to this sensitive component. Similarly, for the same purpose the strip separation sensor 91, in the event of a separational flaw at seam S, forwards a signal to a microswitch 100 associated with that sensor, whereupon a protective impulse is forwarded ahead to inspection unit 11.

However, safety detection unit 10 proposes to maintain a minimal foreign matter accumulation on strip 25 as it reaches the sensors 90 and 91. To this end, the carriage 84 supports, adjacent the side of unit 10 at which strip 25 enters the latter, a pair of parallel, upper and lower air manifolds 102, 103 extending crosswise of the strip 25 advancing therebetween, from which manifolds blasts of air issue to rid the strip of any surface accumulation of a loose type on either side of the strip. Air is supplied to the manifold members through appropriate compressed air conduitry 104 supported by carriage 84, the control of this supply means being part of circuitry shown in FIG. 12.

Accordingly it is seen that the unit 10 incorporates, as mounted in their entirety on a horizontally floating and self-registering carriage, sensitive detecting components and associated electrical means, as well as pneumatic components, through the agency of all of which the strip 25 is as best as possible conditioned prior to entering inspection unit 11, and in any event by which the unit 11 is protected against damage.

HALL INSPECTION UNIT

Figure 6:
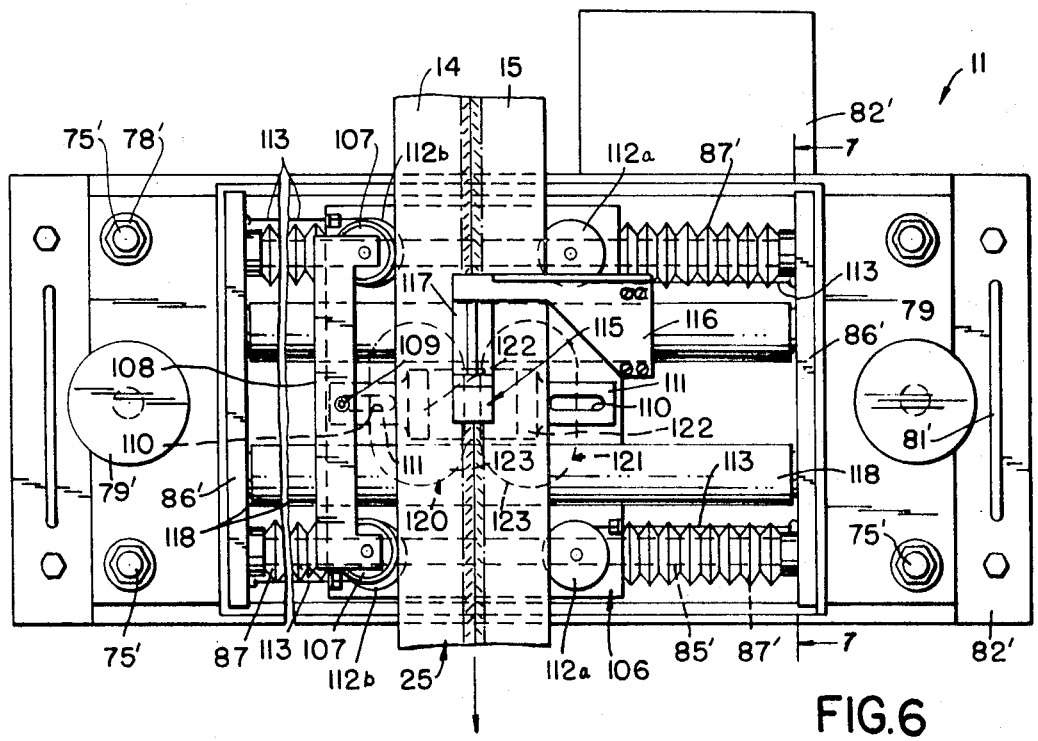
FIG. 6 is a top plan view, similar to FIG. 4, of the Hall probe inspection head structure of the invention.
Figure 7:
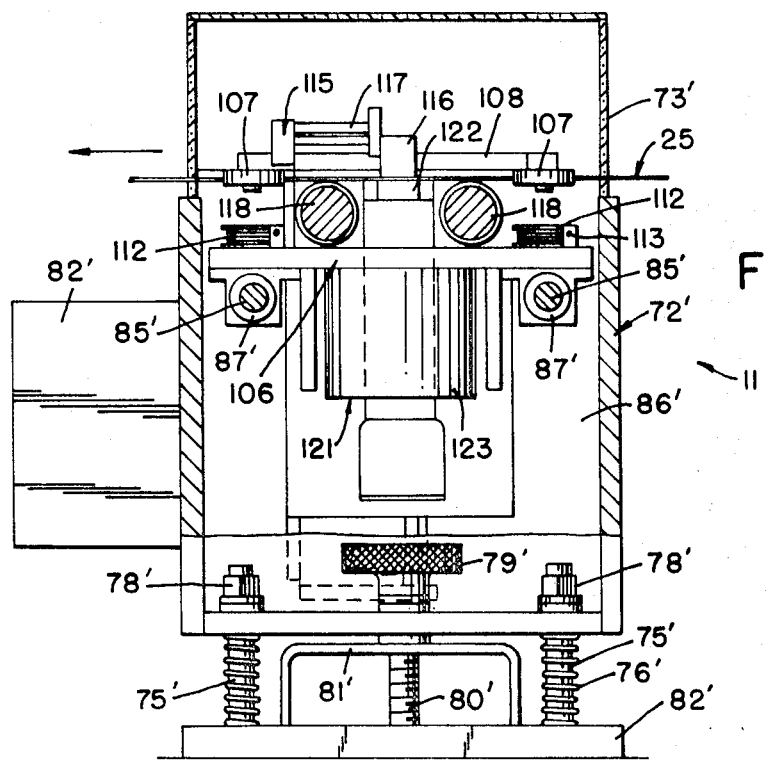
FIG. 7 is an end elevational view, partially broken away and vertically sectioned on a line corresponding to line 7—7 of FIG. 6.

Structural features of the unit 11 are shown in FIGS. 6 and 7. As indicated above in the description of safety detection unit 10, its cabinet or casing structure as a whole is substantially identical to the corresponding structure of unit 10, in particular the means for adjustably and portably mounting the unit. Accordingly, to the extent that features shown in FIGS. 6 and 7 find corresponding features in FIGS. 4 and 5, they are designated by corresponding reference numerals, primed, and further description is dispensed with.

In the case of the inspection head unit 11, a rugged platelike carriage 106 of rectangular outline is slidably mounted on elongated parallel, externally shielded rods 85'; but in this case, two side guide rollers 107 are provided to engage an edge of the advancing strip 25. These rollers are journaled on vertical axes on and adjacent the ends of an elongated yoke 108, which yoke is pivoted on a central upright axis by an elongated bolt 109 threaded downwardly into carriage 106; and above that carriage bolt 109 is received in an elongated slot 110 of a horizontal arm of a bracket 111 fixedly supported by carriage 106, an upright part of which bracket supports a magnet pole piece, to be described.

The carriage 106 is resiliently biased by one of two pairs 112a and 112b of spring motors identical to motors 94, 95, these being located adjacent the corners of the carriage with their cables 113 releasably anchored to the cabinet walls 86'. The location of the roller mounting assembly may be positionally reversed onto the opposite side of strip 25, for example, if the components 14, 15 of welded strip 25 differ in width, requiring a special centering on weld seam S. To this end the carriage 106 mounts a second bracket 111 identical to the first, for the purpose of receiving the fixed yoke pivoting bolt 109 in the reversed position. Actually, in the position shown in FIG. 6 it is the spring devices 112a which bias the yoke and roller assembly to the right against the strip edge, in which case the cables 113 of the opposite spring set 112b would be deanchored; and vice versa when roller yoke 108 is transferred to the right side of strip 25.

Thus a floating reactive mount is provided by carriage 106 for the sensitive Hall effect probe head 115. Head 115 is fixedly supported just above strip 25, and centered on the latter's seam S, by a special bracket 116 adjustably mounted on carriage 106; a lateral extension 117 fixed to this bracket actually mounts probe 115 and affords conduit means through which its electrical wiring may be brought to the junction box 82'.

A pair of parallel and horizontally elongated support rolls 118 accurately sustain the traveling strip 25 in proper vertical position beneath probe 115 to enable electrically transductive (to be described) Hall-effect signal originating element or elements of the latter to function properly in translating magnetic perturbations arising from a varying magnetic field into current pulsations.

In the embodiment illustrated in FIGS. 6 and 7, a pair of electromagnets 120, 121 are employed, in effect representing a "horseshoe" type, the pole pieces 122 and coil windings 123 of these magnets being rigidly mounted to the carriage 106, as by means of the brackets 111, so as to float horizontally and reactively with the carriage under the influence of one or the other pair of spring motors 112a, 112b.

HALL PROBE CIRCUITRY

In accordance with the well-known Hall-named phenomenon, an electrical current flow arises in an adjacent conducting medium when a magnetic field is applied perpendicular to the direction of the current flow. As utilized in the present invention in the continuous inspection of longitudinally moving seam welds, magnetic field perturbations occasioned by defects in the weld are reflected in a current flowing in electrically conducting means constituting an essential part of the inspection probe head 115, i.e., this probe converts the perturbations into electrical signals of one sort or another reflecting any particular condition at the welded zone or seam S.

Figure 10:
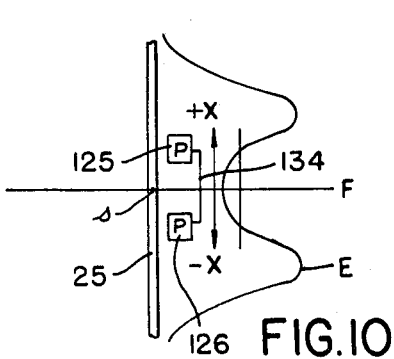
FIG. 10 is a schematic illustrating a relationship of voltage and flux parameters obtaining in a two probe element circuit like that of FIG 9.
Figure 11:
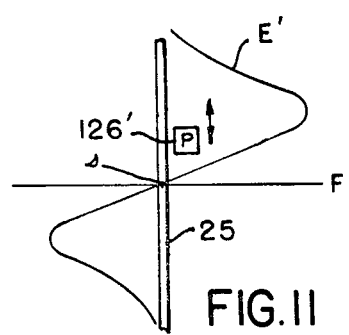
FIG. 11 is a schematic showing the relationship in a probe having but a single probe element.
Figure 9:
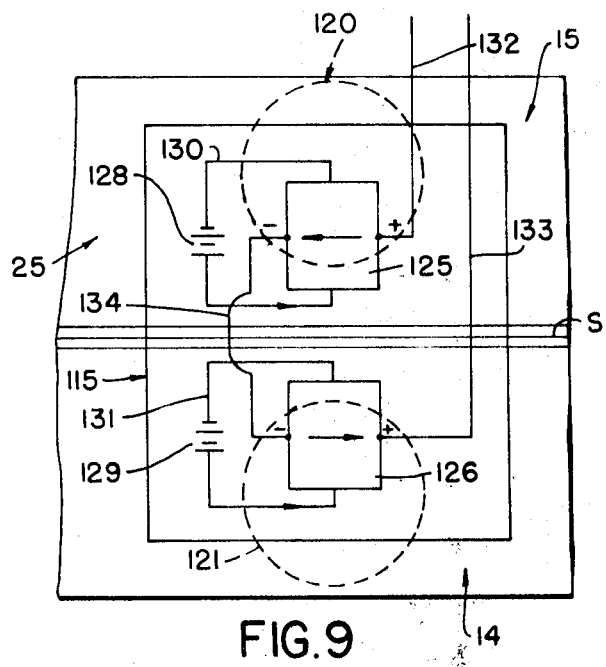
FIG. 9 is a schematic view showing proposed circuitry of a Hall effect probe as typically contemplated by the invention, in which two probe elements are differentially connected.

Such means is represented by the dual, differentially connected semiconductive probe elements 125, 126 which are part of the head 115, as schematically illustrated as to structure in FIG. 9. FIG. 10 is a graphlike showing of magnetic field and voltage or output current effects relating to this dual element type; while FIG. 11 is a similar graphical representation pertaining to an installation in which the probe has but a single conductive probe element responsive to perturbation of the magnetic field established between pole pieces 122. For simplicity, the magnetic pole pieces and coils are not shown in FIG. 9, but the coils are energized by suitable circuit means appearing in FIGS. 12 and 13. Appropriate voltage sources, in FIG. 9 typically represented by batteries 128, 129 or equivalent supply means, establish the necessary voltage drop across the terminals of the respective probe elements 125, 126, through the respective leads 130, 131. Elements 125, 126 are transducers of the semiconductor type, such as the BH 205 Hall effect transducer marketed by F. W Bell, Incorporated, whose excitation current flow direction is as indicated by arrows; and probe voltage output leads 132, 133 respectively connect the positive terminals of the semiconductor probe elements 125, 126 to amplifier circuitry to be described. A jumper lead 134 connects the negative terminals of elements 125 for the desired differential relationship.

FIG. 10 shows the curve of normal output voltage signal E of the differentially connected probe arrangement as being of a distorted sinusoidal shape, never reaching a zero value and intersected transversely at the midpoint of an asymmetric above-zero valley by a parameter line representing normal magnetic flux F at 90° across an increment $s$ of the weld seam S. This output voltage signal E represents the output of the differentially connected probe arrangement as a function of the probe position relative to increment $s$ of weld seam S and transverse to the strip 25 in the directions marked +X and −X.

On the other hand, FIG. 11 represents the curve of the output voltage E' of a probe having but a single Hall transducer 126' as being of a more true sinusoidal shape, whose zero value occurs at the line of intersection thereof by the flux field F', reaching maximum and minimum values on opposite sides of the zero point at which the voltage and flux parameters intersect. Output voltage E' represents the output of the single transducer probe as a function of the probe position relative to increment $s$ of weld seam S and transverse to the strip 25 in the directions marked by the double-tipped arrow.

SAFETY AND INSPECTION HEAD ARRANGEMENT AND ELECTRICAL CIRCUITRY

As suggested in FIG. 1, the safety detection unit 10 is typically located approximately 3½ feet upstream of the direction of travel of strip 25 from the inspection head unit 11. This affords a built-in time delay to allow the elevation of inspection probe 115 safely above the strip when a mechanical defect is detected at unit 10. Such defect may amount to a considerable increase in thickness occasioned by a bending or twisting of the strip, or unusually thick weld bead or foreign material on the strip, as detected by sensor head 90; or the flaw may be represented by an undue increase in overall strip width occurring when unwelded material is present, i.e., the strip components being laterally separated, as detected by the lateral sensor head 92.

Figure 12:
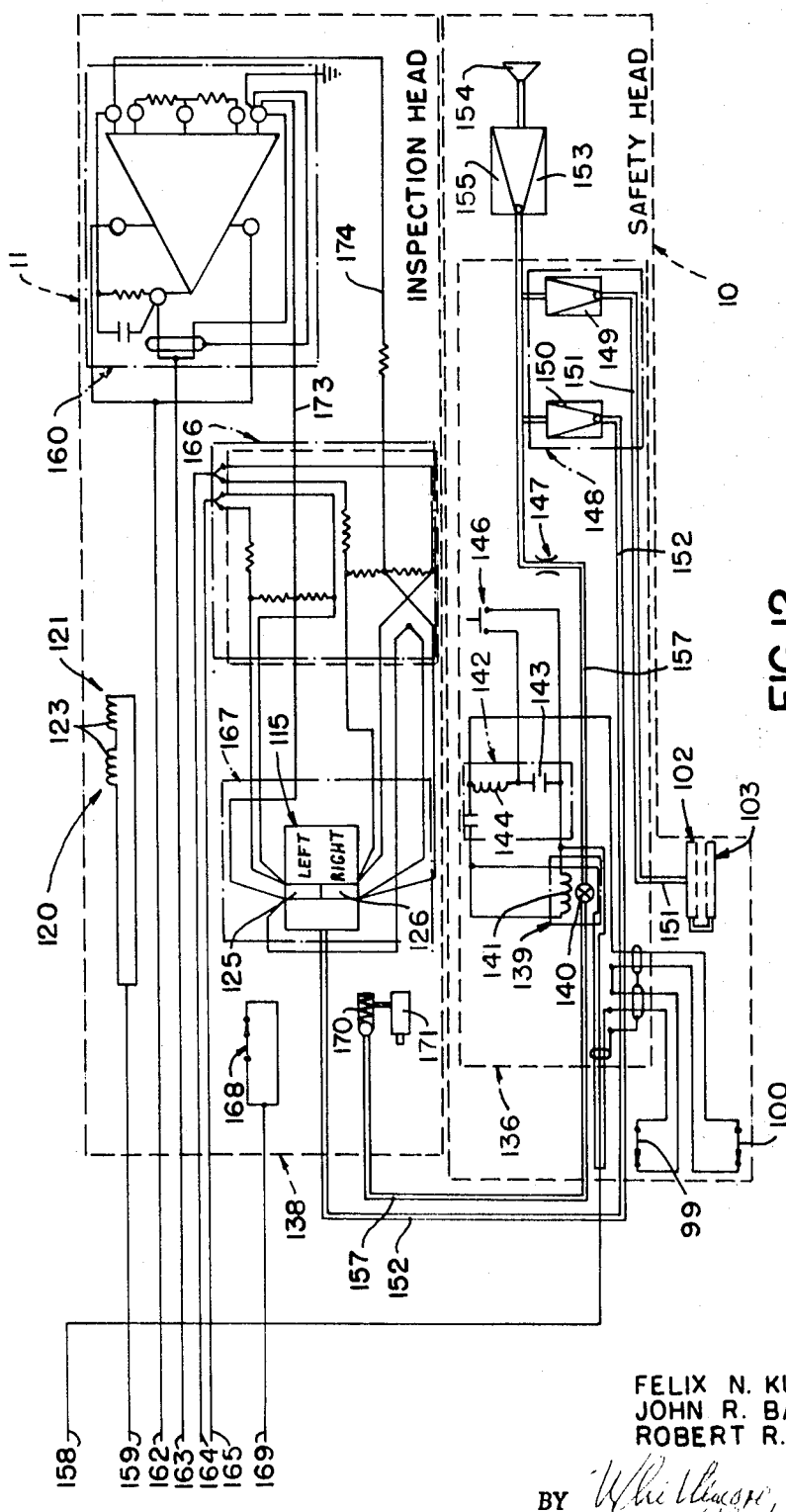
FIG. 12 is a schematic wiring diagram showing components and connections of the electrical circuitry of the safety detection and Hall inspection probe heads of the invention.

Reference should now be had to FIG. 12, generally showing circuit arrangements or subcircuitry 136 of the safety detection unit 10, and corresponding circuitry, generally designated 138, for inspection head unit 11. These electrical arrangements are wired to the circuits power supply hookup 26 of FIG. 13 by certain cable lead components hereinafter mentioned, just as the electrical circuitry of the monitor unit 20 which appears in FIG. 14 is cable connected to the power supply system.

Safety head circuit 136 in general breaks down into a solenoid controlled valve device 139, which may typically be a combination of a Clippard AVSC-115 solenoid and MAV3 valve, including a valve 140 proper controlled by solenoid coil 141; and a relay device 142 governing the energization of valve device 139, including a normally open contact 143 and energizing coil 144; relay 142 may be a Potter & Brumfield built relay designated ABC 11 AY, 115 volt AC. Safety head subcircuit 136 also includes a probe reset switch 146, which is a single pole push button type depressed to energize relay device 142, closing its contact 143 to energize solenoid valve coil 141, and thus, through the agency of valve member 140 and associated cylinder provisions of the inspection subcircuit 138, to be described, to lower the inspection probe 115 into operative relation to advancing strip 25. A flow valve device 147 of the Clippard MFC2 type regulates the speed at which the cylinder referred to lowers the probe into operative position; and a regulator subassembly 148, includes Clippard MAR1 air pressure regulators 149 and 150, the former of which serves the strip cleaner represented by air blast manifolds 102, 103 of safety detection unit 10 through a pressure conduit 151; while the regulator 150 provides a regulated air supply to inspection probe 115 through a conduit 152. This air supply discharges between the probe and the strip 25, in a manner to form an air cushion serving as a final probe positioning means. A filter regulator 153, such as Norgen model B02-221-M2M AV, is a combination device which accepts plant air under a 120-200 p.s.i. pressure at an intake 154, filters it at a component 155, and sets it at an acceptable intermediate level to supply the remainder of air pressure requirements. The microswitches 99 and 100, associated respectively with the foreign material sensor 90 and strip separation sensor 92, are normally closed ones (Microswitch Model BA-2RQ1-A2) tripped by one sensor or the other under the abnormal weld conditions mentioned above, and thus effective to deactivate relay device 142 and solenoid valve device 139, and thereby raise inspection probe 115.

An elongated hose conduit 157, controlled by the flow valve 147 and the solenoid valve device 139, communicates the air supply source 153 with air-emission orifice means associated with the probe 115, in a manner to be referred to in connection with the inspection head circuitry 138. A single shielded electrical cable 158 extends between safety head subcircuit 136 and the power supply circuitry 26 of FIG. 13, hereinafter described, the leads of this cable being wired to valve and switch devices 139, 142 in the manner shown in FIG. 12.

The inspection head wiring and other arrangements 138, as depicted in FIG. 12, comprise the series-connected magnetizing coils 123 of electromagnets 120, 121, which coils are connected by conductors of a cable 159 to power supply circuit 26. The coils are typically of 884 turns each in a contemplated installation, and actually electromagnets 120, 121 resemble a U-shaped magnet whose pole pieces 122 afford an approximate ⅜-inch gap centered at the weld line or seam S.

The inspection head module also includes a preamplifier 160, preferably a Burr Brown model 3003/15 and, of course, the Hall probe unit or head 115. The circuit of preamplifier 160 is electrically connected to the power supply system 26 by leads of shielded cables 162 and 163; while further similar cables 164, 165 connect the power supply system with the wiring of a matching network 166 within subcircuit 138, to which network the various conductors of the electrical probe assembly 167 as a whole connect. Inspection subcircuit 138 also includes a microswitch 168, the terminals of which are connected by a cable 169 to power circuit 26, the purpose of switch 168 being to sense and signal the fact that the probe 115 is down and in an operative position relative to the advancing strip 25.

Finally, a quick exhaust valve 170 controls a return cylinder 171, to which probe 115 is mechanically connected to be raised to avoid its damage if either of the microswitches 99, 100 of the safety head circuitry 136 is tripped, with the result of dropping out relay 142 and raising of the probe. In this respect the arrangement is fail safe, since the inspection probe 115 will be raised in the loss of air pressure or electric power. By preference valve 170 is the model MEV-1 quick exhaust valve of Clippard Instrument Laboratories, while cylinder 171 is a 9BS block mount cylinder produced by the same concern.

To recapitulate, the two BH205 Hall transducers 125, 126 of probe head 115 detect magnetic perturbations at the weld seam S and convert them into an electrical signal of proportional magnitude reflecting variations in weld quality, which signal is amplified and processed to be ultimately read out at the monitor unit 20. The preamplifier 160 builds up the signal, as transmitted through probe subcircuit 167 and matching network 166 by leads 173, 174, then connects the signal through shielded conduit cables 162, 163 to the power supply system of FIG. 13. The designated preamplifier 160 is one having extreme stability, displaying negligible drift due to time or normal temperature change. The resistor network 166 matches each Hall effect transducer so that their individual variations are not "seen" by the subsequent signal processing equipment. Further functions of the matching network 166 are the proper match of the power supply 26 and amplifier 160, along with assuring the proper biasing and interconnections. This may be considered as a part of the probe circuit assembly 167, although remotely located.

In connection with the probe transducers 125, 126, they are connected differentially, as indicated above in order to produce a desirable signal characteristic; and they are mounted in a plastic block which locates them above the strip 25 equidistant on opposite sides of the weld seam S. This block is drilled for air passage; and the air cushion formed between the probe block and the strip by air traversing conduit 152 determines the final position of the transducers.

The actual power supply to serve the Hall probe 115 derives from a regulated DC current forwarded through cables 164, 165 from certain module components of the system 26, to be described.

MONITOR UNIT CIRCUITRY

Figure 13:
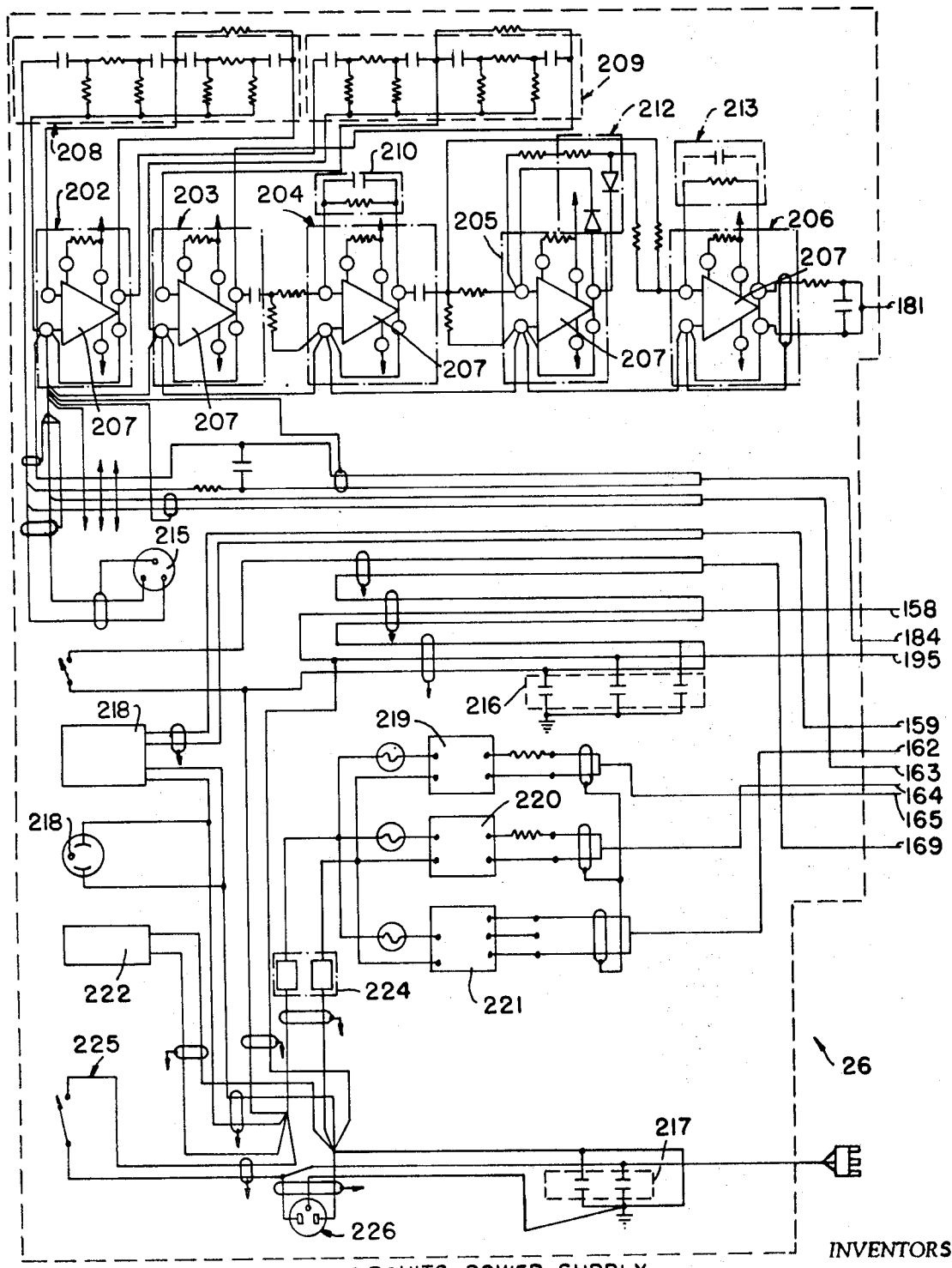
FIG. 13 is a schematic diagram of the power supply circuitry in a signal circuit enclosure of the system, with which circuitry the wiring of FIG. 12 connects.
Figure 14:
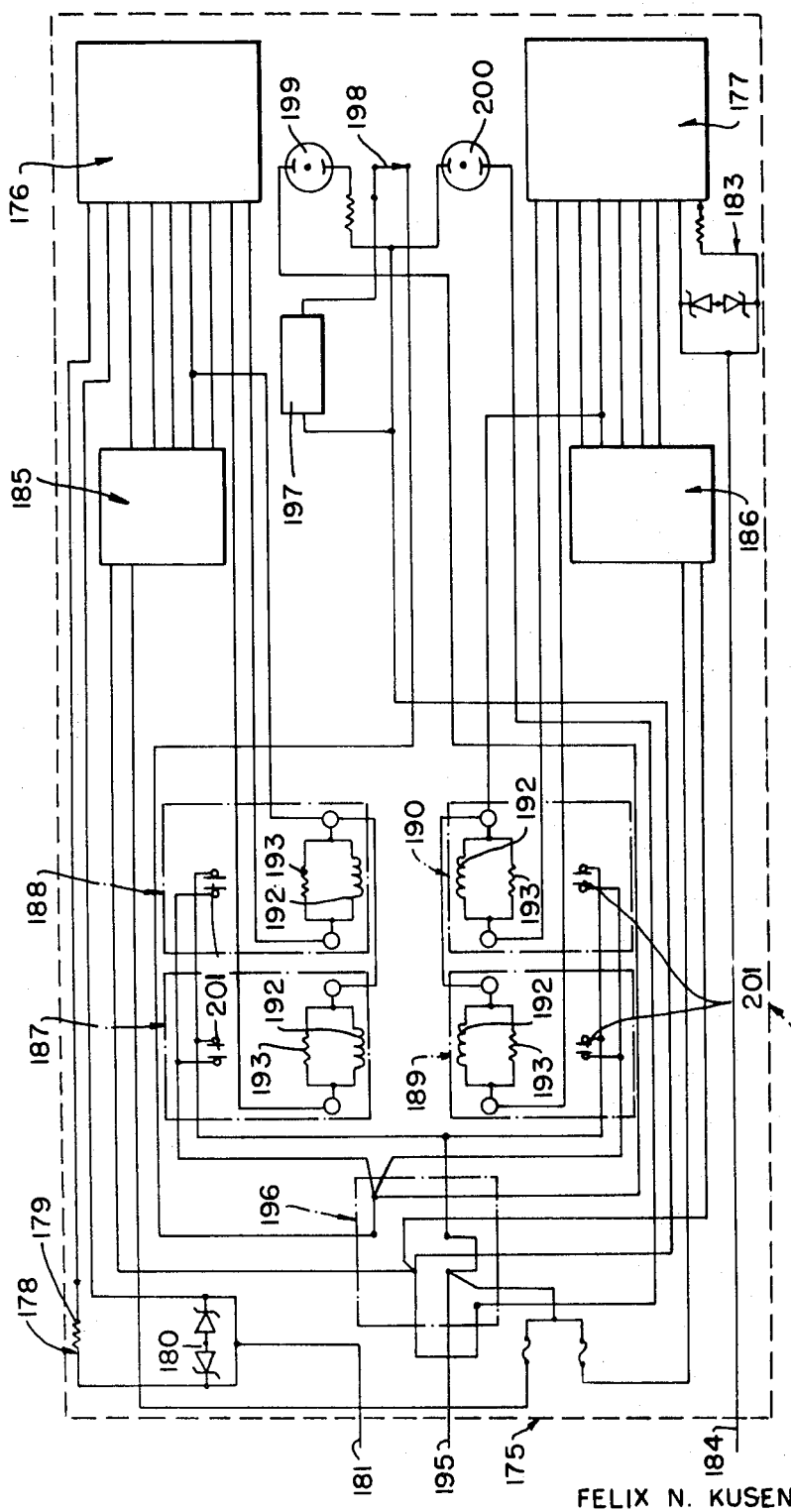
FIG. 14 is a similar schematic showing components and connections of the circuitry for the readoff or monitor unit of the illustrated equipment, also its connections to the electrical power supply system of FIG. 13.

The electrical system 175 for the readout monitoring unit 20 is illustrated in FIG. 14, being electrically supplied by the system of FIG. 13, as are components of the safety detection and Hall inspection electrical systems of FIG. 12. As shown in FIGS. 1 and 3 unit 20, as located adjacent the welding station 18, has two meter readout dials, 176, 177, one indicating AC voltage level and the other indicating DC voltage level. The meters are equipped with adjustable high and low set points which mark the minimum and maximum signal level representing acceptable weld quality. When the preset limitations have been exceeded, there is a visual alarm, as at a pilot light, and an audio alarm, as at a buzzer, which call the operator's attention to the out of tolerance condition.

AC meter 176 is connected electrically to a conventional and commonly available diode-resistor network 178 of the Zener type, including a resistor 179 and diode 180, the leads of which network connect to power supply system 26 through a cable 181. AC indicator 176 displays a signal that has been routed from the preamplifier 160 of FIG. 12 through certain amplifiers of the power supply of FIG. 13, and their individual signal processing networks. The DC indicator 177 operates on the DC level provided by the preamplifier 160 of FIG. 12, through a diode-resistor network 183 similar to the network 178, network 183 being connected to the power supply system by a cable 184. The networks 178, 183 protect meters 176 against burnout should the signal level exceed maximum capability of the meters.

The reference numerals 185 and 186 designate Weston model 9980 power supplies to provide reduced and rectified power to the meters 176, 177, which in turn power certain adjustable limit controls and relay units 187, 188, 189 and 190. Each of these includes a relay 192, the function of which is later described, and resistors 193 parallel the relay windings to minimize the effect of inductive feedback. A power supply cable 195 connects this relay set (as well as certain terminal connections at 196 of the meters 176, 177 and power supplies 185, 186) to the power supply circuitry of FIG. 13.

Preferably the indicator meters 176 and 177 are Weston model 1075 double set point meter relays—2QUA—full scale. They indicate signal level sensed by the probe 115 after amplification and processing to retain a portion of the signal.

The reference numeral 197 designates an audible alarm device in monitor circuit 175 which is electrically connected to an audible alarm disable switch 198; while the reference numeral 199 designates a visual alarm device wired to audible device 197 and the alarm switch. Both alarm devices are electrically connected to a visual probe position indicator 200. In operation if any of the relay units 187–190 is activated, the audible alarm 197 is sounded and the visual alarm 199 is illuminated, provided alarm disable switch 198 is closed. Normally open contacts for each of the relays 187, 188, 189 and 190 are designated 201 in FIG. 14. The switch 198 is a readily available standard item. When lighted, indicator 200 shows that the probe 115 is in operative position. This is a standard neon pilot light, as is the visual alarm device 199.

CIRCUITS POWER SUPPLY

The power supply circuitry 26, as mounted in the enclosure or cabinet 70 between safety and inspection units 10 and 11 behind the line of travel of welded strip 25, is illustrated in FIG. 13. It contains amplifiers and matching networks, an auxiliary 120-volt outlet, output jacks, a pilot light, switches and a blower-filter combination for cooling the interior of enclosure 70, as presently described.

Thus power system 26 comprises five electrically connected amplifier units, subassemblies or networks, generally designated individually as 202, 203, 204, 205 and 206, each having an essential amplifier 207 connected to input and output terminals in the manner shown. Associated with the respective amplifier units 202 and 203 are a pair of identical 10 hertz filter networks, generally designated 208 and 209, governing lower cutoff frequency. The amplifier units 202 and 203 are Nexus SQ 10A operational amplifiers with which filter networks 208 and 209 cooperate to permit the passage of a desirable frequency range through the two amplifier networks 202, 203 for further processing, all other frequencies being removed. The gain of each network 202, 203 is unity, the signal leaving at the same voltage level as it was received.

Furthermore, the filter networks 208 have the function of allowing the desired select frequency band to read out as an AC signal level at the monitor unit meter or indicator 176 (FIG. 14). The frequency will fall into the audio range with a low cutoff at 10 Hz. Radio frequencies are eliminated, since they are not a factor in a weld quality indicating system, and if present have been accidentally picked up somewhere in the system as a whole.

Amplifier unit 204 also is a Nexus SQ 10A operational amplifier which serves as an impedance match for the succeeding similar amplifier unit or network 205, the unit 204 additionally including an external resistance-capacitance subcircuit 210 which provides a means for adjusting gain and time constants. Amplifier unit 204 has a gain of 25; and the gain for the entire system is adjusted at this point in a way such that questionable weld quality indications begin about midscale of the AC indicating meter 176 (FIG. 14).

Amplifier unit 205 is a Nexus SQ 10A operational amplifier connected to a resistor-diode subnetwork 212, and in conjunction therewith converting the received AC signal to a DC level. This signal is actually read out on AC meter 176 inasmuch as that meter has a DC type movement, despite the fact that it is indicating AC levels.

The final amplifier unit 206 is also a Nexus SQ 10A operational amplifier, which is connected to a resistance capacitance subcircuit device 213, the latter being an external and changeable portion of amplifier network 206. Device 213 establishes a time constant for the purpose of averaging the signal level over a given period of time. For example, assuming the time constant is established at 1 second, the monitor meter indication at 176 (FIG. 14) will display an average of the condition detected over a period of 1 second. This represents a travel of strip 25 at 180 feet per minute; that is, an average weld condition of 3 feet of the strip is inspected as to quality each second.

All of the Nexus SQ 10A amplifiers 202 through 206 are commercially available units, but require calibration such as a skilled operator can attend to in order to function properly in the interdependent subcircuitry involving them.

The reference numeral 215 in FIG. 13 designates a preamplifier output jack, located at the front of signal circuit enclosure 70, which will supply all signal information, AC and DC level combined, as it comes from the preamplifier 160 of the inspection head circuitry 138 of FIG. 12. The purpose of the jack 215 is to enable the use of the incoming preamplifier signal to drive devices other than the monitor meters 176 and 177 of the electrical system 175 of FIG. 14. Examples are an oscilloscope, strip chart recorders, fault correction or control devices, and the like; sue of jack 215 as a computer input for total process controls is ultimately contemplated.

The capacitor devices 216 and 217 appearing in FIG. 13 are Sprague-Hypass 48P9 capacitors which pass electrical interference to ground, so that the involved circuits handle only 60 cycle power. All higher, radiofrequency or transient factors are filtered out by units 216 and 217, which are commercially available ones requiring no adjustment or calibration.

The unit 218 in FIG. 13 is a Harrison MPB3 Series model 6284A power supply manufactured by Hewlett-Packard-Harrison, which supplies 0–20 direct current voltage at 0–3 amperes. Its input supply is 120 volts AC–60 Hz., and its output is a regulated constant voltage with less than 5 millivolt change through a load change from zero to full. There is also constant current regulation, i.e., less than 0.01 percent plus 250 UA for a zero to maximum change in output voltage or a line voltage change within the input rating of 105–125 V. at 50 to 400 Hz. Thus the constant current circuit affords a protective feature guarding the supply from all overloads, including a direct short circuit. Power supply unit 218 is used to power the inspection head electromagnet 120, 121, the operating level being 2.8 amperes. A signalling pilot lamp 218' is connected across two terminals of supply 218.

The reference numerals 219 and 220 denote BX 12N 3–1 power supply units or modules produced by AC—DC Electronics, Inc., which supply a regulated DC current to be used by the Hall effect transducers 125, 126 of probe 115. The regulation is 0.01 percent or 0.001 volt for line changes of 10 percent, or 0.01 percent or 0.002 volt for a no load to full load change. These models are commercially available, but require calibration and adjustment to meet the special circuit requirements of the system.

A power supply unit 221 of the Burr Brown 501 type is included in power system 26 to supply DC power to the Burr Brown preamplifier 160 of the inspection head circuitry 138 shown in FIG. 12, being appropriately matched to the amplifier.

The reference numeral 222 in FIG. 13 designates a blower of Bud-Transaire manufacture, type B–23; it is a combination blower and filter unit which provides filtered air at 100 to 200 cubic feet per minute to minimize heat buildup generated by the enclosed electrical parts. It has a 1/20 horsepower motor and changeable glass fiber filter; and is a commercially available device.

A Cornell-Dubilier filter unit 224, model NFR 124–1, provides line filters to remove undesirable signals from the voltage driving the power supplies 219, 220 and 221, these filters being commercially available. A Wood electric model 112 10A circuit breaker and switch device 225 affords on-off switch and protective breaker means in the 120-volt power supply for the inspection subassembly or circuit 167 of FIG. 12. The reference numeral 226 in FIG. 13 designates a second auxiliary jack outlet to supply filtered 120 volt-60 Hz. power for additional equipment such as the oscilloscope, chart recorders and the like mentioned above.

FIG. 13 shows cable connections of its power supply system to circuit components of the systems 136 and 138 of FIG. 12 and 175 of FIG. 14. These include, from top to bottom as viewed at the right of FIG. 13: (a) the cable 181 connecting the amplifier and filter networks 202 through 206, 208 and 209 with the diode and AC monitor meter components 180, 176, respectively, of FIG. 14; (b) the cable 158 connecting a subsystem including capacitor devices 216 and 217, output jack 226, breaker-switch 225, etc., with the solenoid valve unit 139, relay device 142 and probe reset switch 146 of the safety head circuitry 136; (c) the cable 184 connecting output jack 215 and the amplifier-filter system of FIG. 13 to the diode unit 183 and DC meter 177 of monitor system 175; (d) the cable 195 connecting the second set of leads, corresponding to the set in cable 158, to the indicated components of system 136; (e) the cable 159 connecting leads of the power supply 218 with the coils 123 of magnets 120, 121; the cable 162 connecting power supply 221 of FIG. 13 with preamplifier 160 of FIG. 12; (f) the cable 163 connecting the filter-amplifier and associated subcircuitry with the preamplifier 160 of inspection head system 138; the cable 164 connecting power supply 220 with matching network 166 of the same system 138; the cable 165 connecting power supply 219 with the matching network 166 of FIG. 12; and the cable 169 connecting power supplies 218 and 221, breaker-switch 225, etc., with the microswitch 168 of inspection head circuitry 138.

Figure 8:
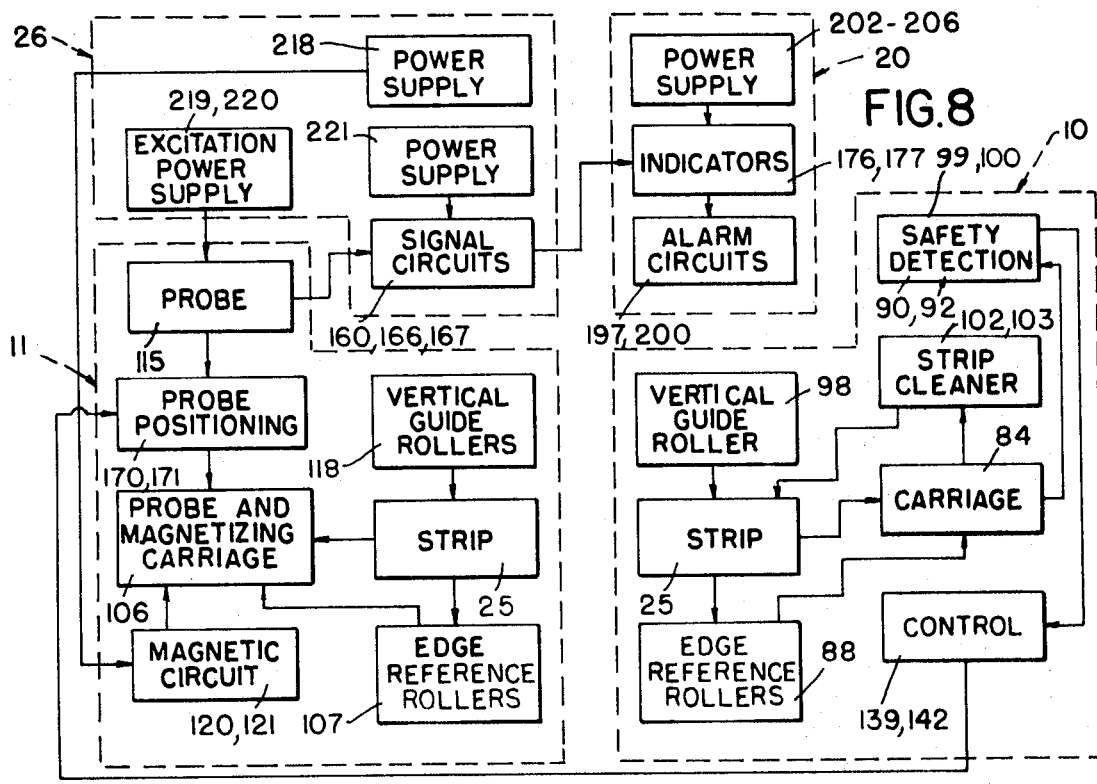
FIG. 8 is a line and block diagram of the inspection, monitoring and power supply equipment of the invention.

FIG. 8 of the drawings schematically shows functional relationships, whether mechanical, fluid pressure or electrical, which exist between the various components of the safety detection unit 10, the Hall probe inspection unit 11, the monitor unit 20 and the power supply system 26. Arrowheaded lines depict the functioning of the components, enabling FIG. 8 to be generally interpreted in the following manner.

As for safety unit 10, the air blast strip cleaner components 102 and 103 clean the strip 25 as well as possible, the strip being physically sustained by vertical guide rollers 98, and in turn influencing the side or edge reference guide roller 88. This operates reactively to shift safety head carriage 84, along with the rollers 88, 98 and cleaner components 102, 103 mounted thereon, to maintain sensors 90 and 92 properly positioned in relation to the strip. Said sensors signal, through their respective microswitches 99, 100, to energize relay unit 142, in the event of either a danger-threatening weld seam accumulation or a strip separation, the relay in turn operating solenoid valve unit 139, with the effect of mechanically positioning probe 115 of inspection unit 11 accordingly, through the agency of its fluid pressure valve and cylinder means 170, 171 of FIG. 12.

As for the Hall inspection unit 11, its probe 115, as excited by the DC power supplies 219, 220 and influenced in its output voltage by the magnetic flux circuit of electromagnets 120, 121, transmits electrically the variations in its said output to probe signal circuits electrically connected to the power supply system 26. These include the preamplifier 160, matching network 166 and probe subcircuit 167 appearing in FIG. 12. They are electrically energized by power supply unit 221; and they feed the amplified signals to the indicators 176, 177 and alarm circuits 197, 198, 199 and 200 shown in FIG. 14. Overall power comes from the connected amplifiers 202-206 of system 26, and the several filter, relay and diode means associated therewith.

In a mechanical sense, the traveling strip, as supported in the inspection unit 11 by vertical guide rollers 118, mechanically shifts the side or edge reference guide rollers 107, which react to position the probe and magnet mounting carriage 106 in a manner to maintain a proper positional relation of probe 115 and the magnetic field to the strip 25.

Figure 15:
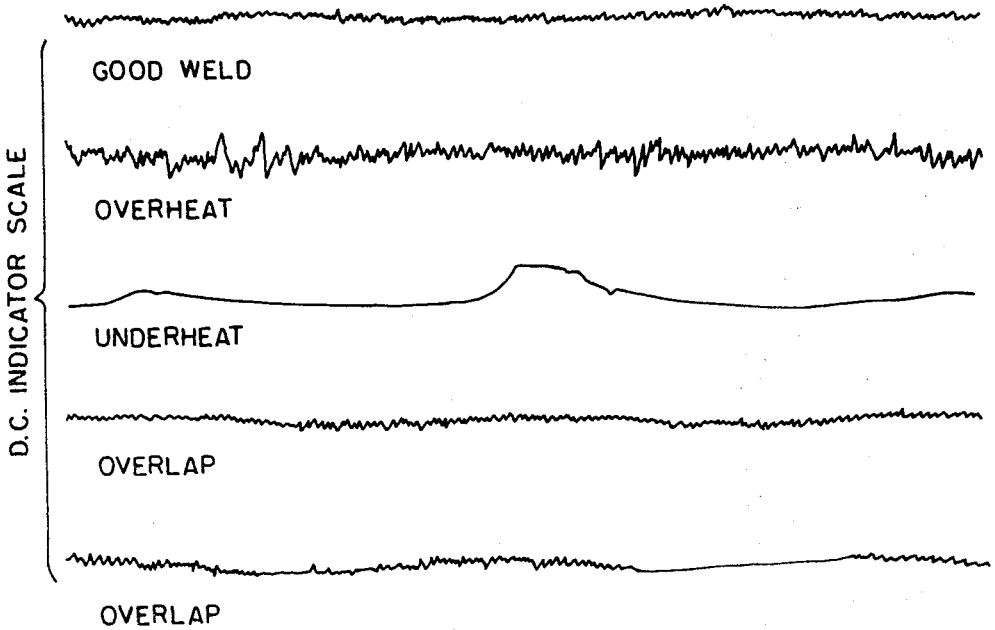
FIG. 15 is a composite diagram depicting records of preamplifier output signals representing typical types of weld condition, as ascertained and read out by the circuit arrangements of FIGS. 9 and 12-14.

FIG. 15 depicts signals reflected, on a moving strip chart (or other type of indicating recorder) associated with monitor unit 20, the nature of weld conditions which will be monitored by the Hall inspection unit 11. They range top-to-bottom from a good weld displaying a substantial uniformity of signal amplitudes through typical types of weld, i.e., an overheat, an underheat and two variations of weld overlap, all of which may be considered objectionable. The typical records of FIG. 15 were monitored from a preamplifier output signal and weld monitor response, being based on a strip chart speed of 125 mm./sec., a vertical sensitivity of 1 volt per centimeter, and a speed of strip 25 amounting to 160 ft./min., the components of the strip 25 being galvanized and stainless steel.

In summation, the inspection probe 115 which converts the magnetic field perturbations into electrical signals incorporates two Hall Effect elements 125, 126 although the use of one is permissible. In general, such Hall elements have a small output voltage in the absence of a magnetic field, which is termed "offset voltage." Although this voltage can be made essentially zero by the use of external alignment circuitry, it was necessary to investigate the possible change of this voltage under temperature change, since such a variation could influence indicator readout at monitor unit 20 as a function of ambient operating temperature. The results of tests conducted show such offset voltage variation as a function of temperature to be negligible over the design ambient temperature range of 60° to 95° F. These results are in agreement with those obtained by F. W. Bell Inc. (the vendor for the Hall elements used in the probe 115) in tests on individual elements of the same type. The output Hall voltage as a function of magnetic field, for the type of element used in the probe design, is also affected by temperature; however, this variation is negligible.

Operation of a Hall element requires the element to be excited with an AC or DC electrical current. Since the Hall elements in the probe for this equipment are excited with a DC current from power supplies 219, 220 it was necessary to develop a realistic specification for maximum permissible ripple from any power supplies to be used as probe excitation sources. The above-identified commercially available power supplies utilized in this system have a ripple characteristic which is acceptable on the basis of ripple tests performed with two Hall elements of the type used in the system Repeatability and reliability of the weld monitor readout requires that the signal processing circuitry, as well as the Hall probe, have good temperature and long term stability characteristics. In this regard, probably the most critical part of the signal circuit, other than the Hall probe, is the preamplifier circuit 160. Extensive temperature and stability tests were conducted on the preamplifier used in this equipment, the results of which tests showed the preamplifier to have acceptable temperature and stability characteristics, provided the unit is not subjected to rapid time-rates-of-change-of-temperature. In order to minimize such rates-of-change-of-temperature, the preamplifier is preferably housed in a thermally insulated enclosure. In addition, the preamplifier package is placed in good thermal contact with the large thermal mass, such as might be represented by the inspection head housing structure 72'.

The signal processing circuitry which time-averages the AC output of the Hall probe for presentation on the AC indicator 176, has desired stability as a function of temperature; a 2-hour warmup period is specified for best system stability.

The AC indicator response is proportional to a time-average of the AC signals from the Hall probe. The time interval over which the average is taken then becomes a parameter In the system and can be interpreted in terms of an equivalent length of weld along the strip. For the information to be meaningful to the operator, the averaging time needs to be sufficiently long so that the operator, for example, would not see a representation of each individual weld pinhole, but would rather get indications of an average number of pinholes in several feet of strip. In order to give some flexibility in later modification of this averaging time, a circuit has been designed which would permit a selection of the time constant from approximately 0.5 second to 3 seconds, equivalent to 1.25 feet to 7.5 feet strip travel, respectively, at a line speed of 150 feet per minute. Actually, the lower end of the time constant range, 0.5 second, is determined by the mechanical time constant of the relay meter.

Adverse weld conditions which are of interest in determining the quality of the strip weld seam include a stuck or paster weld, no weld at all, intermittent weld, overlap (in the sense not desired when forming a butt joint as contemplated in the above-mentioned Briggs application and patent), variation of weld geometry, planish geometry and conditions, inclusions or voids, and pinholes, all of these being conditions well known in the art.

In regard to mechanical structure of the units 10 and 11, FIGS. 4–7 show their casing and mounting features to be in many respects identical, lending to an economical standardized manufacture.

What is claimed is:

1. Apparatus for the continuous inspection of the condition of the welded connection of a plurality of metallic components of a traveling welded strip, comprising an inspection unit traversed by a longitudinally extending weld zone of said strip, said unit having means to create a magnetic field adjacent said zone, and Hall effect probe means originating an electrical output in response to and variably reflecting a variation in said field occasioned by a variation in the weld condition of the strip, a readout monitoring unit, and means powered by said output to forward to said monitoring unit signals respectively representative of said field variations, said inspection unit having means guiding said strip for travel past the probe means, said guiding means including a movable carriage on which said probe means is mounted, and means on said carriage engaged by and responsive to the lateral position of the strip to cause the carriage and probe means to shift so as to maintain a predetermined position of the probe means in relation to the strip.

2. Apparatus for the continuous inspection of the condition of a welded connection of at least two metallic components of a traveling welded strip, comprising an inspection unit traversed by a longitudinally extending weld zone of said strip, said unit having means to create a magnetic field adjacent said strip and transverse of the direction of travel of the latter and said weld zone, and Hall effect probe means originating an electrical output transverse of said field direction in response to and variably reflecting perturbations in said field occasioned by variations in the condition of said welded connection, a readout monitoring unit, and means powered by said output to forward signals respectively representative of said varying field perturbations to said monitoring unit, said inspection unit having means guiding said strip for travel past the probe means, said guiding means including a movable carriage on which said probe means is mounted, and means on said carriage engaged by and responsive to the lateral position of the strip to cause the carriage and probe means to shift so as to maintain a predetermined position of the probe means in relation to the welded connection of the strip.

3. Apparatus for the continuous inspection of the condition of a welded connection of at least two metallic components of a traveling strip, comprising an inspection unit traversed by a longitudinally extending weld zone of said strip, said unit having means to create a magnetic field adjacent said strip and transverse of the direction of travel of the latter and said weld zone, and Hall effect probe means originating an electrical output transverse of said field direction in response to and variably reflecting perturbations in said field occasioned by variations in the condition of said welded connection, a readout monitoring unit, and means powered by said output to forward signals respectively representative of said varying field perturbations to said monitoring unit; and a detection unit traversed by said strip weld zone in approaching said inspection unit, said detection unit having sensing means also responsive to a condition of the strip, and means to forward a signal from said sensing means to said inspection unit which reflects the last named condition, said inspection and detection units each having means guiding said strip for travel past the respective probe and sensing means thereof, said guiding means including in each case a movable carriage on which said respective means are mounted, and means on the carriage engaged by and responsive to the lateral position of the traveling strip to cause the carriage and respective probe and sensing means thereon to shift so as to maintain a predetermined position of said probe and sensing means in relation to the welded connection of the strip.

4. Apparatus for the continuous inspection of the condition of a welded connection of at least two metallic components of a traveling strip, comprising an inspection unit traversed by a longitudinally extending weld zone of said strip, said unit having means to create a magnetic field adjacent said strip and transverse of the direction of travel of the latter and said weld zone, and Hall effect probe means originating an electrical output transverse of said field direction in response to and variably reflecting perturbations in said field occasioned by variations in the condition of said welded connection, a readout monitoring unit, and means powered by said output to forward signals respectively representative of said varying field perturbations to said monitoring unit; and a detection unit traversed by said strip weld zone in approaching said inspection unit, said detection unit having sensing means also responsive to a condition of the strip, and means to forward a signal from said sensing means to said inspection unit which reflects the last-named condition, said inspection unit having means controlled by said last named signal to bodily shift said probe means relative to the welded connection, said inspection and detection units each having means guiding said strip for travel past the respective probe and sensing means thereof, said guiding means including in each case a movable carriage on which said respective means are mounted, and means on the carriage engaged by and responsive to the lateral position of the traveling strip to cause the carriage and respective probe and sensing means thereon to shift so as to maintain a predetermined position of said probe and sensing means in relation to the welded connection of the strip.

5. The apparatus of claim 1, in which said strip-engaged means comprises a roller rotatable on the carriage, and means resiliently biasing said roller against an edge of the strip.

6. The apparatus of claim 2, in which said strip-engaged means comprises a roller rotatable on the carriage, and means resiliently biasing said roller against an edge of the strip.

7. The apparatus of claim 1, in which said strip-engaged means comprises a roller bodily carried by and rotatable on the carriage, and means resiliently biasing said roller against an edge of the strip, whereby the carriage may have a floating movement in reaction to and corresponding to a lateral shift of the strip.

8. The apparatus of claim 5, in which said biasing means comprises an extensible cable and spring-biased reel about which the cable is reeled, the cable having one end fixedly mounted and an opposite end connected to the carriage.

9. The apparatus of claim 5, in which the carriage has means enabling said roller to be mounted on either side of the traveling strip.

10. The apparatus of claim 8, in which the carriage has means enabling said roller to be mounted on either side of the traveling strip.

11. Apparatus for the continuous inspection of the condition of a welded connection of at least two metallic components of a traveling strip, comprising an inspection unit traversed by a longitudinally extending weld zone of said strip, said unit having means to create a magnetic field adjacent said strip and transverse of the direction of travel of the latter and said weld zone, and Hall effect probe means originating an electrical output transverse of said field direction in response to and variably reflecting perturbations in said field occasioned by variations in the condition of said welded connection, a readout monitoring unit, and means powered by said output to forward signals respectively representative of said varying field perturbations to said monitoring unit; and a detection unit traversed by said strip weld zone in approaching said inspection unit, said detection unit having sensing means also responsive to a condition of the strip, and means to forward a signal from said sensing means to said inspection unit which reflects the last named condition, said sensing means of the detection unit including a first electrically responsive sensor disposed adjacent the traveling weld zone to detect and signal as to the condition of the weld, and a second sensor disposed adjacent an edge of the strip to detect and signal also as to the weld condition.

12. The unit of claim 11, in which said sensing means is movably positionable in respect to said path of travel.

13. The unit of claim 12, and further comprising means to transmit such signals external of said unit.

14. The unit of claim 13 in which said sensors are mounted by a movable carriage having means engaging an edge of the traveling strip, and means resiliently biasing said carriage and edge-engaging means to maintain said sensors in desired relation to the seam weld and first named edge of the strip.

15. The unit of claim 14, in which said sensors are mounted by a movable carriage having means engaging an edge of the traveling strip, and means resiliently biasing said carriage and edge-engaging means to maintain said sensors in desired relation to the seam weld and first named edge of the strip.

16. Apparatus in accordance with claim 2, and further comprising a detection unit traversed by said strip weld zone in approaching said inspection unit, said detection unit having sensing means also responsive to a condition of the strip, and means to forward a signal from said sensing means to said inspection unit which reflects the last named condition.

17. Apparatus in accordance with claim 16, in which said sensing means of said detection unit has relay-type control means electrically responsive to a signal forwarded by said sensing means to said inspection unit, said control means being operably connected to further means capable of acting on said probe means of the inspection unit to protect said probe means.

* * * * *

UNITED STATES PATENT OFFICE
CERTIFICATE OF CORRECTION

Patent No. 3,619,769  Dated November 9, 1971

Inventor(s) Felix N. Kusenberger, John R. Barton, Robert R. King

It is certified that error appears in the above-identified patent and that said Letters Patent are hereby corrected as shown below:

Column 12, line 14, of patent (application, page 30, line 9, ) "sue" should be --use--;

Claim 14, line 1, "13" should be --12--;

Claim 15, line 1, "14" should be --13--.

Signed and sealed this 2nd day of May 1972.

(SEAL)
Attest:

EDWARD M. FLETCHER, JR.
Attesting Officer

ROBERT GOTTSCHALK
Commissioner of Patents